US012561903B2

(12) United States Patent (10) Patent No.: US 12,561,903 B2
Azmandian et al. (45) Date of Patent: Feb. 24, 2026

(54) FULL-BODY EXTENDED REALITY INTERACTION

(71) Applicant: Sony Interactive Entertainment LLC, San Mateo, CA (US)

(72) Inventors: Mahdi Azmandian, San Mateo, CA (US); Ariele Araceli Silvas, San Mateo, CA (US); Murshed Akmed Choudhury, Foster City, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 133 days.

(21) Appl. No.: 18/408,412

(22) Filed: Jan. 9, 2024

(65) Prior Publication Data

US 2025/0225723 A1 Jul. 10, 2025

(51) Int. Cl.
*G06T 17/00* (2006.01)
*G06F 3/01* (2006.01)
*G06V 20/40* (2022.01)

(52) U.S. Cl.
CPC .............. *G06T 17/00* (2013.01); *G06F 3/011* (2013.01); *G06V 20/44* (2022.01)

(58) Field of Classification Search
None
See application file for complete search history.

(56) References Cited

U.S. PATENT DOCUMENTS

2014/0177944 A1* 6/2014 Kutliroff ................. G06T 7/251
                                                              382/154
2020/0089661 A1* 3/2020 Raichelgauz ........... G06F 16/35

2020/0143595 A1* 5/2020 Hrincár ................... G06F 3/012
2021/0045628 A1 2/2021 Bennett et al.
2024/0303939 A1* 9/2024 Briel ....................... G06F 3/016

OTHER PUBLICATIONS

Wikipedia; "Neon White"; https://en.wikipedia.org/wiki/Neon_White; Release dates of Jun. 16, 2022, and Dec. 13, 2022; Printed from the Internet on Apr. 10, 2024; pp. 1-10.
International Search Report and Written Opinion in International Appln. No. PCT/US2024/062413, mailed on Mar. 3, 2025, 14 pages.
beatsaber.com [online], Beat Saber, available on or before Dec. 28, 2023, via Internet Archive: Wayback Machine URL<https://web.archive.org/web/20231228160225/https://beatsaber.com/>, retrieved on Oct. 28, 2025, URL<https://beatsaber.com/>, 18 pages.

* cited by examiner

*Primary Examiner* — Yingchun He
(74) *Attorney, Agent, or Firm* — Fish & Richardson P.C.

(57) ABSTRACT

Systems and methods for providing extended reality (XR) interactions are provided. A system includes a motion tracker device, an XR display device, and a processor. The processor is configured to execute computer-readable instructions to display XR content in a three-dimensional (3D) space for an interaction session, track the full-body motion of a user relative to the 3D space, and define an interaction plane in the 3D space. The XR content includes obstacle elements and target elements moving toward the interaction plane in the 3D space. The system determines an event score for an interaction event based on checks whether a user body part overlaps the target element in the interaction plane and whether all user body parts avoided overlapping the obstacle element in the interaction plane.

20 Claims, 8 Drawing Sheets

*FIG. 3*

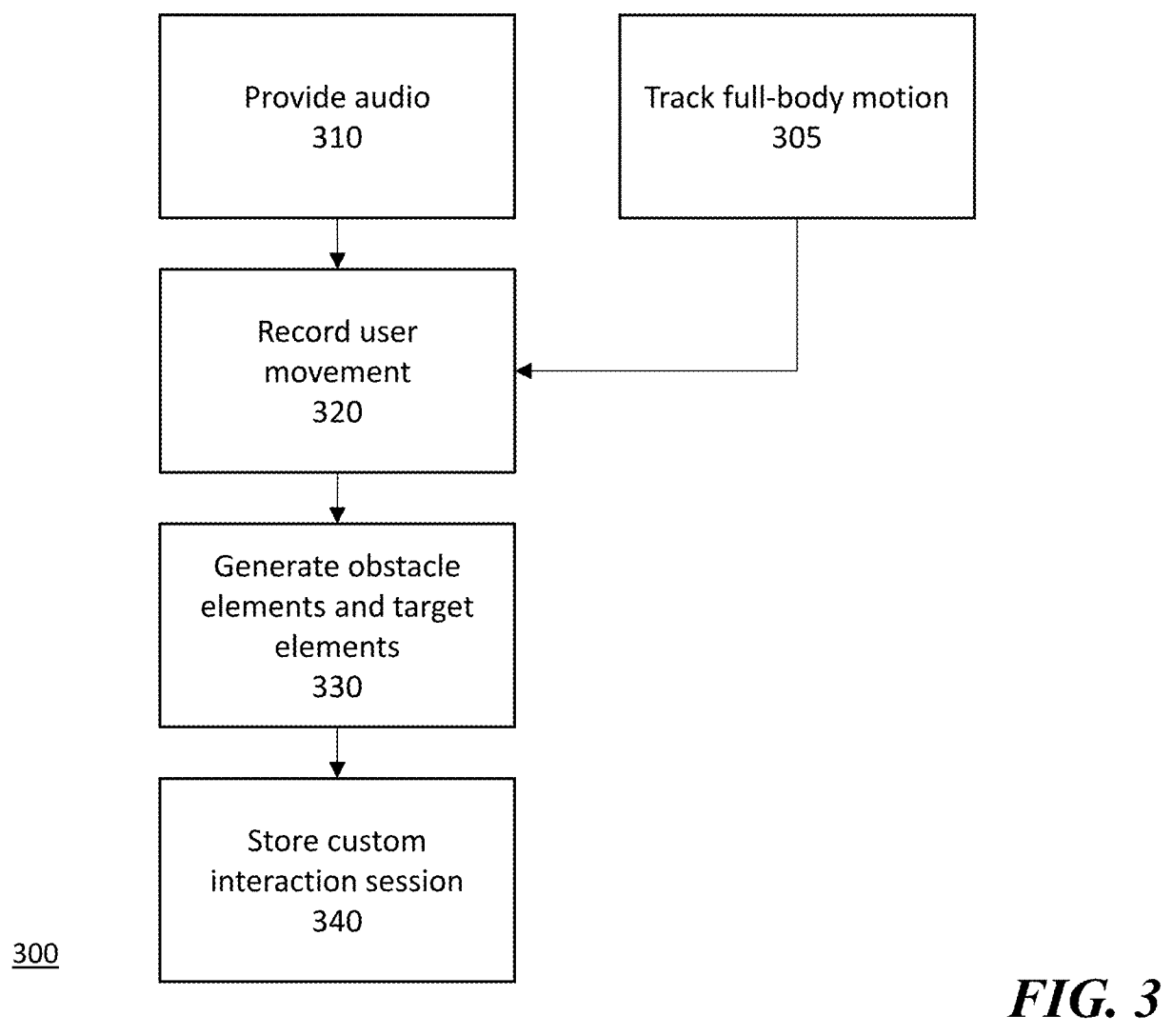

Track full-body motion
305

Provide audio
310

Record user
movement
320

Generate obstacle
elements and target
elements
330

Store custom
interaction session
340

300

FULL-BODY EXTENDED REALITY INTERACTION

BACKGROUND OF THE INVENTION

Field of the Invention

The present invention relates generally to computer-simulated user interfaces, and more specifically to providing a full-body extended reality game.

Background

Extended Reality (XR) is a term that encompasses the spectrum of experiences between the real world and simulated ones, including Virtual Reality (VR), Augmented Reality (AR), and Mixed Reality (MR). XR technology has been increasingly adopted in various fields, including gaming, where it provides immersive and interactive experiences to players.

BRIEF DESCRIPTION OF DRAWINGS

The above and other aspects, features and advantages of embodiments of the present invention will be more apparent from the following more particular description thereof, presented in conjunction with the following drawings wherein:

FIG. 3 is a flow diagram of a method for generating custom XR interaction content according to some embodiments;

DETAILED DESCRIPTION

In some aspects, the techniques described herein relate to a system for providing extended reality (XR) interactions. The system includes a motion-tracking sensor; an XR display device; and a processor in communication with the motion-tracking sensor and the XR display, the processor is configured to execute computer-readable instructions to: display, via the XR display device, XR content in a three-dimensional (3D) space for an interaction session; track a full-body motion of a user relative to the 3D space via the motion-tracking sensor; define an interaction plane in the 3D space; display to the user, via the XR display device, a plurality of obstacle elements and a plurality of target elements moving toward the interaction plane in the 3D space; and determine and display a score for an interaction event based on: when a target element arrives at the interaction plane, whether a user body part overlaps the target element in the interaction plane; and when an obstacle element arrives at the interaction plane, whether all user body parts avoided overlapping the obstacle element in the interaction plane.

Figure 1:
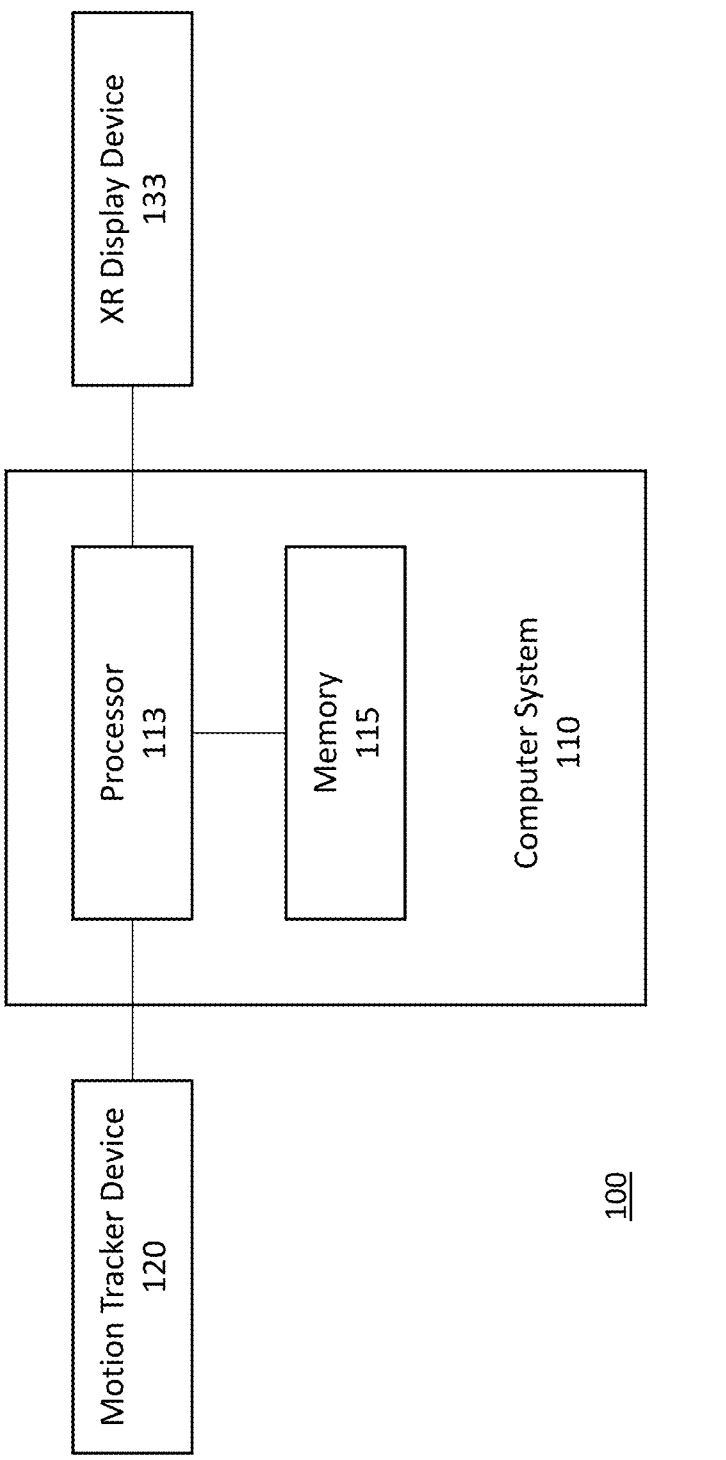
FIG. 1 is a block diagram of a system for providing XR interaction according to some embodiments.

Referring to FIG. 1, a system 100 in accordance with some embodiments of the present invention is shown. In some embodiments, the computer system 110, the motion tracker device 120, and the XR display device 133, may be used for implementing, executing, or practicing many of the methods, schemes, techniques, systems, or devices described herein. The system 100, which in some embodiments, may be configured to execute one or more steps described with reference to FIGS. 2 and 3.

The computer system 110 includes a processor 113, a memory 115, and a wireless and/or wired connection with the motion tracker device 120 and the XR display device 133. In some embodiments, the computer system 110 may further comprise a network adapter configured to receive and transmit data over a network such as the internet to provide interactive content. In some embodiments, the components communicate with each other via connections and/or communications channels, which may comprise wired connections, wireless connections, network connections, or a mixture or combination of both wired and wireless connections, communications channels, network connections, buses, etc. In some embodiments, the computer system 110 may comprise a game console, an entertainment system, a gaming computer, a personal computer, a desktop computer, a notebook computer, a workstation, a server, a portable device, a mobile device, a pad-like device, a smartphone, etc.

The processor 113 may be used to execute or assist in executing the steps of the methods, schemes, and techniques described herein. For example, in some embodiments, the processor 113 executes code, software, or steps that implements, carries out, and/or facilitates the user interface for providing the XR interaction. Particularly, the computer system 110 may be configured to receive input from the motion tracker device 120 and generate user interface display contents for display on the XR display device 133. In some embodiments, the user interface content may be determined based on computer executable codes or media files stored on the local memory 115 and/or received from a digital content or game server via a network such as the Internet.

The memory 115 may include or comprise any type of computer readable storage or recording medium or media. In some embodiments, the memory 115 may include or comprise a tangible, physical memory. In some embodiments, the memory 115 may be used for storing program or computer code or macros that implement the methods and techniques described herein, such as program code for running the methods, schemes, and techniques described herein. In some embodiments, the memory 115 may serve as a tangible non-transitory computer readable storage medium for storing or embodying one or more computer programs or software applications for causing a processor-based apparatus or system to execute or perform the steps of any of the methods, code, schemes, and/or techniques described herein. For example, an instance of the XR game software described herein may be installed on the memory 115. Furthermore, in some embodiments, the memory 115 may be used for storing any needed media files such as image and audio files. In some embodiments, after the initial installation of the game software, additional content may be downloaded and/or streamed from an online content source such as a gaming service server.

Figure 8:
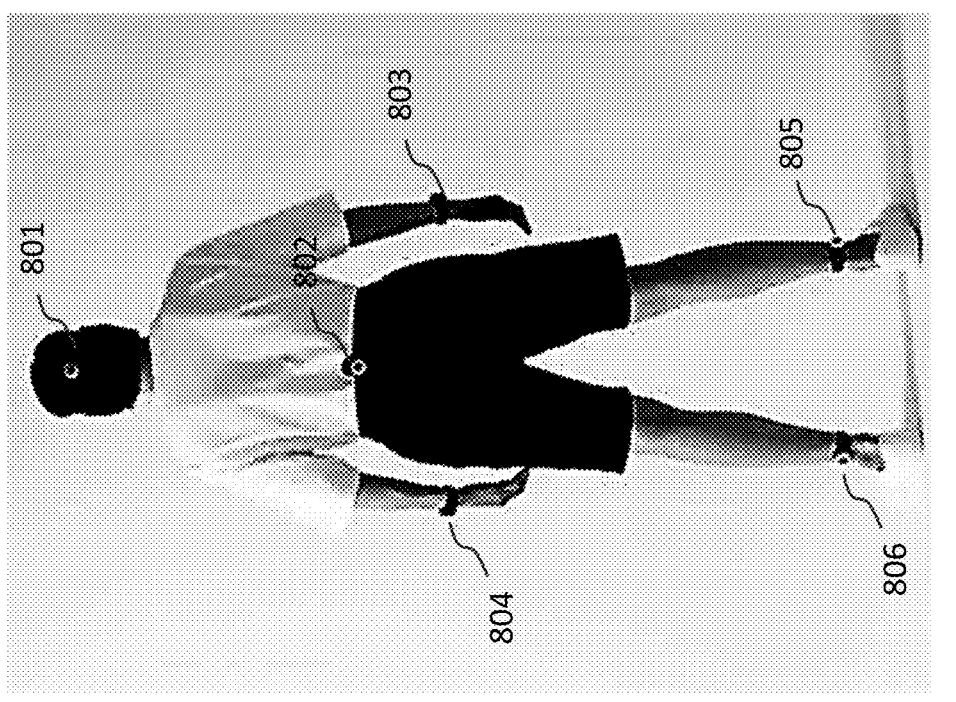
FIG. 8 is an illustration of a full-body tracking system according to some embodiments.

The motion tracker device 120 may comprise one of more devices for tracking the full-body motion of a user. In some embodiments, full-body motion includes the motions of arms and legs. In some embodiments, full-body motions further include the motions of head and torso. In some embodiments, the motion tracker device 120 may comprise inertial and/or optical motion trackers. For example, the motion tracker device 120 may comprise a plurality of wearable inertia sensors that track the motions of the body part wearing the sensor. An example of a full-body inertial motion tracking system is shown in FIG. 8. In FIG. 8, a user wears a head tracker 801, a torso tracker 802, a right arm tracker 803, a left arm tracker 804, a right leg tracker 805, and a left leg tracker 806. Each of the trackers may include an inertial measurement unit (IMU) such as a gyro sensor, which allows the system to estimate the position and posture of every major joint in the body using data from the six sensors. In some embodiments, the position and posture estimation may be based on an artificial intelligence (AI) model trained using training sensor data with verified position and posture data. In some embodiments, the motion tracker device 120 may comprise a Sony mocopi 3D Motion Capture System. In some embodiments, the motion tracker device 120 may comprise an optical sensor that tracks user movement based on capturing 2D and or 3D images of the user.

Figure 4:
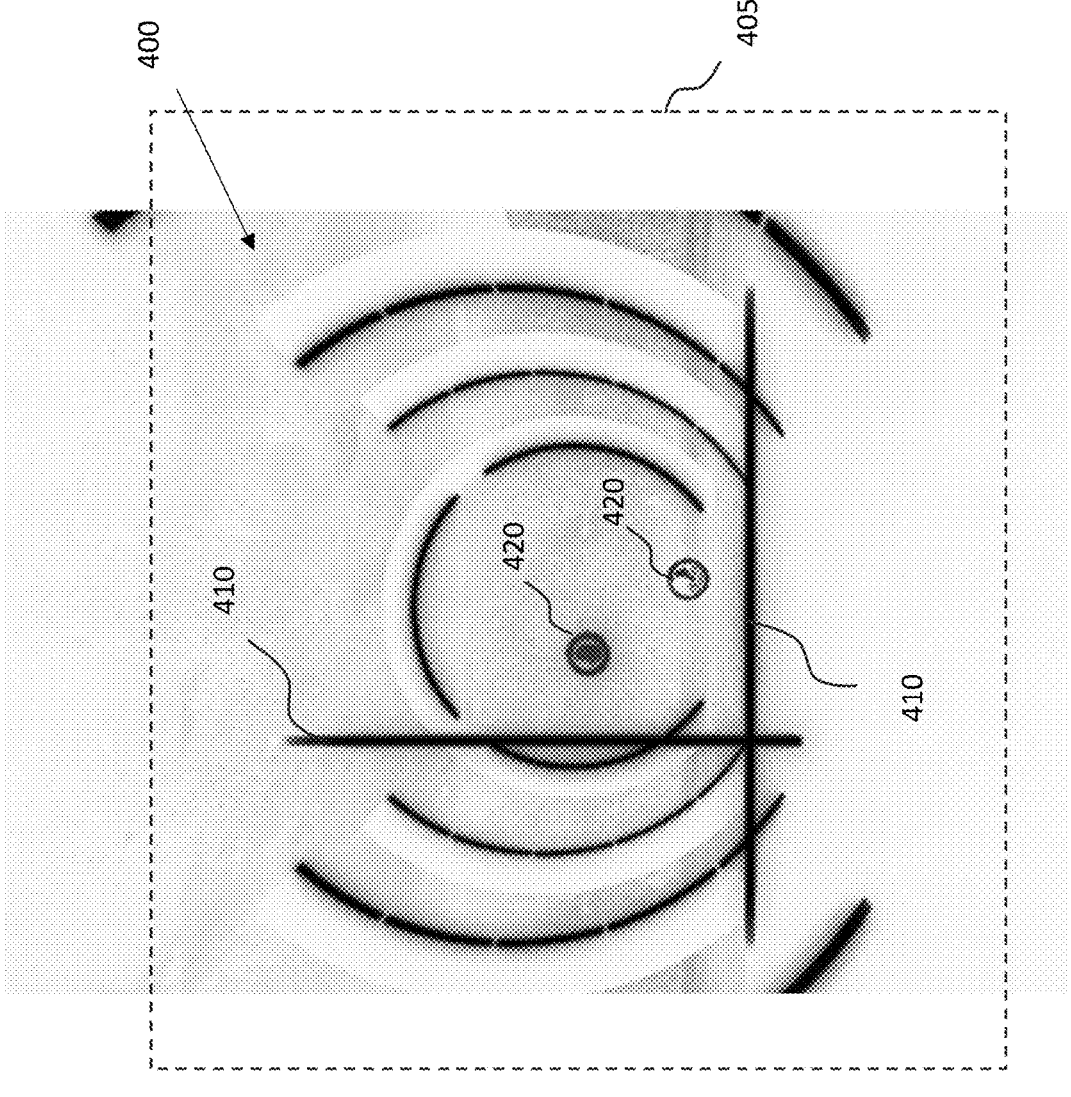
FIGS. 4, 5, and 6 are illustrations of example XR content according to some embodiments.
Figure 5:
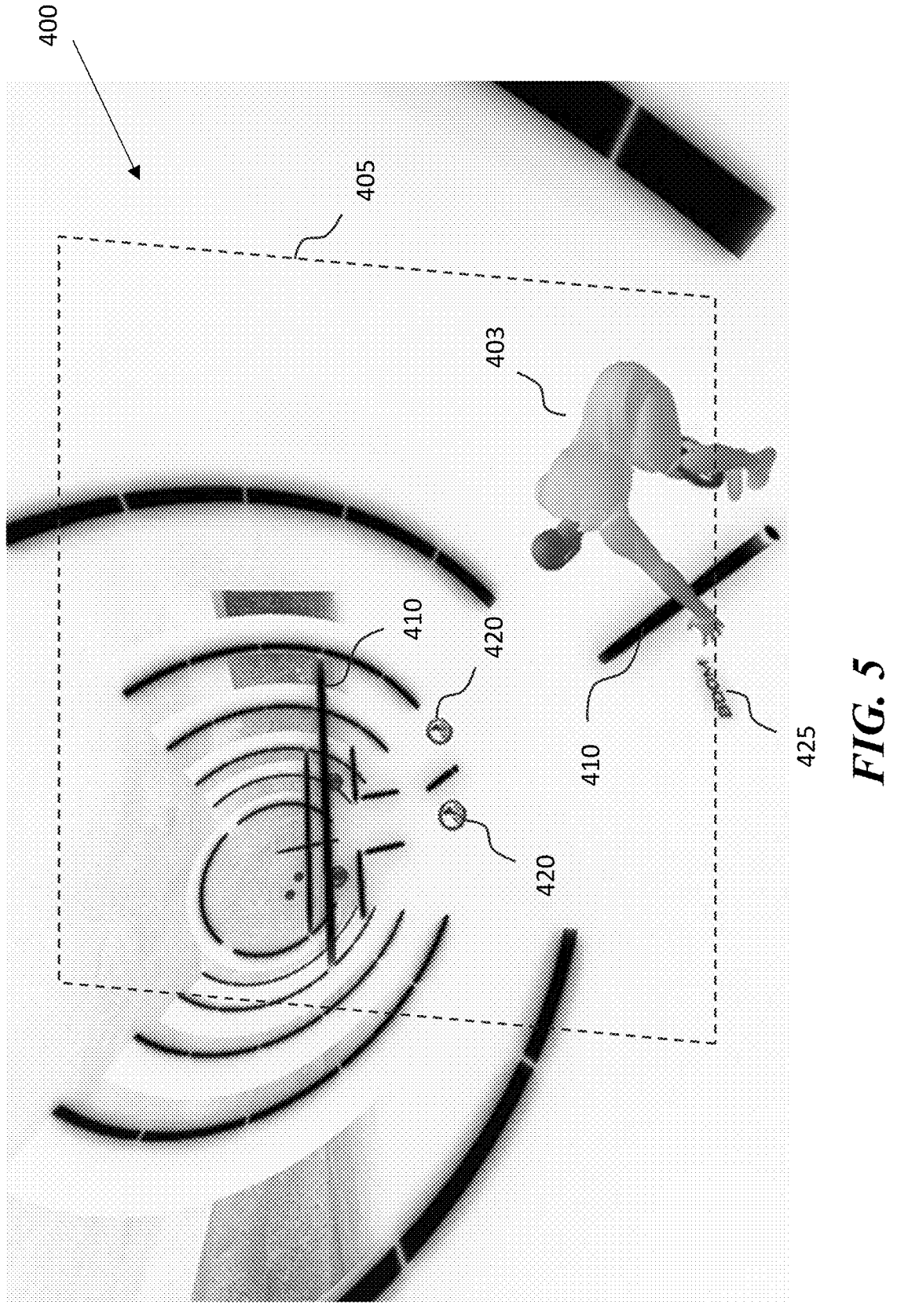
Figure 6:
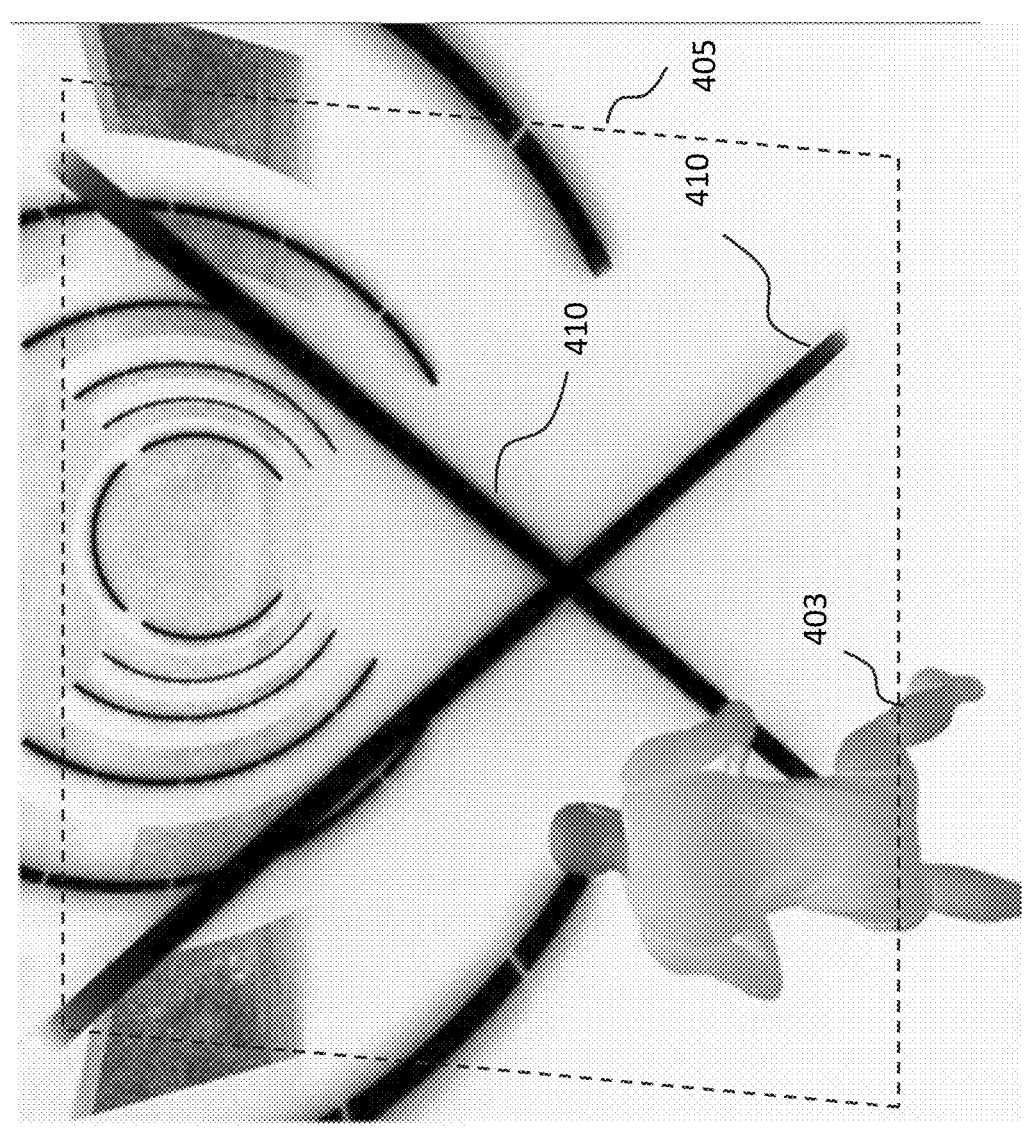

The XR display device 133 may comprise a display configured to display XR content to a user based on signals received from the computer system 110. Examples of content may be displayed via the XR display device 133 are illustrated in FIGS. 4, 5, and 6. In some embodiments, the XR display may include an AR, VR, and/or MR display device. In some embodiments, the XR display may include a head-mounted display unit, a VR headset, a set of smart glasses, a projection display unit, a holographic display unit, and the like. In some embodiments, the XR display device 133 may include a head tracker that functions as part of the motion tracker device 120. In some embodiments, the XR display device 133 may further include an eye tracker and/or a head tracker that serves as an input for the computer system 110 in generating the display content. In some embodiments, the XR display device 133 may include other input/output devices such as a speaker, a microphone, one or more buttons, etc.

Figure 2:
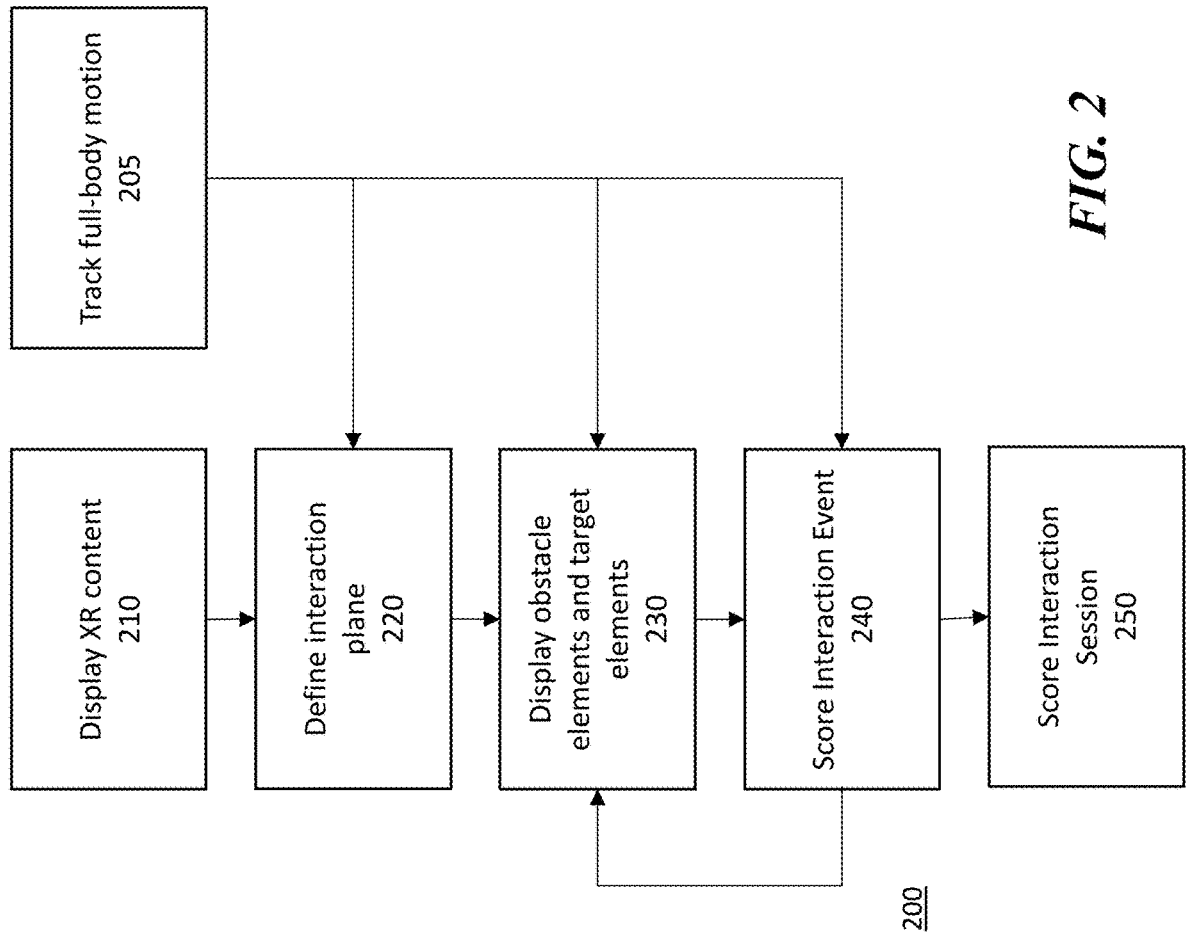
FIG. 2 is a flow diagram of a method for providing XR interaction according to some embodiments.

Next referring to FIG. 2, a method 200 for providing interactive XR content is shown. In some embodiments, the method 200 is executed by a processor-based system or apparatus, such as the computer system 110. In some embodiments, the method shown in FIG. 2 may be provided via a video game software executing on a processor-based system communicatively coupled to a motion tracker device and a XR display device to provide an XR interactive experience to a user.

In step 210, the system displays XR content in a three-dimensional (3D) space for an interaction session via an XR display device. The 3D space may be a virtual space with a corresponding 3D space around the user of the XR display device. In some embodiments, the XR content may include visual elements that correspond to the 3D space, such as walls, pillars, boundary lines, etc. In some embodiments, the XR content may further include menus, instructions, configuration options, etc.

In step 205, the system tracks the motion of the user via a motion tracker device such as the motion tracker device 120. In some embodiments, the motion tracker device includes an inertial and/or optical motion tracker. In some embodiments, the system may estimate the user motion based on the signals from the motion tracker. In some embodiments, the system may further use an AI model to estimate the user motion based on signals from the motion tracker. In some embodiments, the system tracks the full-body motion of the user. In some embodiments, the full-body motion of the user comprises arms, legs, torso, and head motions.

In some embodiments, prior to step 220, the system may display a calibration user interface configured to calibrate a position of an interaction plane relative to the user. For example, the calibration interface may record user motion in response to specific motion instructions to calibrate the motion tracker signals to the user's motion such that the location of the interaction plane corresponds to the timing of user's motion.

In step 220, an interaction plane is defined within the 3D space of the XR content. The interaction plane may generally be a vertical plane in the 3D space. In some embodiments, the 3D space may comprise a tunnel and the interaction plane may cover one end of the tunnel facing the user. In some embodiments, the interaction plane may be substantially parallel to the coronal plane of the user. In some embodiments, the interaction plane may be positioned at a set distance in front of the user. In some embodiments, the location of the interaction plane within the 3D space may move with the forward and backward movement of the user during an interaction session and/or be fixed.

In step 230, the system begins an interaction session by displaying obstacle elements and target elements in the 3D space. The obstacle elements and the target elements may be display such that they move from a distant plane/point towards the interaction plane in the 3D space. In some embodiments, the obstacle elements and the target elements may have fixed positions in the x-y plane parallel to the interaction plane and moves to the interaction plane in the z axis, perpendicular to the interaction plane. In some embodiments, obstacle elements may include linear elements such as lines or bars. In some embodiments, the obstacle elements may include a plurality of differently angled linear and/or intersecting elements such as those shown in FIGS. 4, 5, 6, 7A, 7B, and 7C. In some embodiments, obstacle elements may include one or more linear elements that are parallel to or perpendicular to the interaction plane.

In some embodiments, the target elements include one or more circular, triangular, square, or polygonal elements. In some embodiments, a target element may include an indicium (e.g., shape, color) associated with a property of the target element such as associated difficulty or score points. In some embodiments, a target element may be associated with a specific body part (e.g., right hand, left leg) and include an indicium (e.g., icon, color) indicating the associated body part. Examples of target elements are illustrated in FIGS. 4 and 5.

In some embodiments, the plurality of target elements and the plurality of obstacle elements may move toward the interaction plane at variable speeds during the interaction session. For example, an interaction session may include one or more fast moving sections separated by slow moving sections. In some embodiments, the XR content further comprises audio, and the moving speeds the plurality of obstacle elements and the plurality of target elements toward the interaction plane are timed such that the obstacle elements and/or the target elements arrive at the interaction plane on beat with the audio content.

In step 240, the system determines an event score for an interaction event. In some embodiments, an interaction event corresponds to an event when an obstacle element and/or a target element crosses the interaction plane. In some embodiments, an interaction event may comprise only obstacle element(s) or only target element(s). In some embodiments, an interaction event may comprise one, two, three, or more obstacle elements and/or target elements. In some embodiments, the event score is determined based on, when a target element arrives at the interaction plane, whether a user body part overlaps (e.g., contacts) the target element in the interaction plane. In some embodiments, the event score is determined based on, when an obstacle element arrives at the interaction plane, whether all user body parts avoided overlapping (e.g., avoid) the obstacle element in the interaction plane. In some embodiments, the event score is greater if all user body parts avoid overlapping the obstacle element during the interaction event. In some embodiments, event score is greater if a user body part overlaps the target element in the interaction plane during the interaction event. In some embodiments, the score may be further determined based on the user body part that overlaps the target element. For example, a target element may be associated with and indicate a specific body part (e.g., left foot, right hand, etc.). Contacting the target element with the corresponding body part may result in a higher score.

In some embodiments, the event score is further determined based on positions of a plurality of user body parts when the obstacle or target element arrives at the interaction plane. For example, if the user's posture is determined to be difficult or stylish, they may receive a higher score for the event. Whether a posture is difficult or stylish may be determined based on comparing the sensed posture of the user with a database of preference postures. In some embodiments, the event score is determined based on comparing a full-body position of the user with a database of recorded full-body positions of a plurality of other users interacting with the XR content. For example, the user may receive a higher score for being in an uncommon posture or closely matching a reference posture.

In some embodiments, the event score may be greater if the user avoids obstacle elements and contacts target elements with the same posture. In some embodiments, the event score may be greater based on a combination of events. For example, if the user consistently scores high on multiple events, the user may receive a combo bonus score. In some embodiments, the event score and/or a cumulative interaction session score may be displayed to the user in the user interface prior to the next interaction event. In some embodiments, the user interface may output graphic, audio, and/or haptic feedback to the user for successful or unsuccessful avoidance of obstacle elements and/or successful or unsuccessful contacts of target elements. For example, an obstacle element may light up or grow red and/or a wearable device on the user may vibrate when an obstacle element is contacted. In another example, a target element may change in appearance (e.g., replace with text or a different icon) when contacted.

In some embodiments, after one or more interaction events the system may recalibrate the interaction plane by adjusting the location of the interaction plane relative to the user and/or within the 3D space based on tracking the full-body motion of the user. For example, if the user is consistently early or late in their motions relative to game elements, the interaction plane may be moved closer or further away from the user.

During an interaction session, the system may repeat steps 230 and 240 any number of times to display a series of target elements and a series of obstacle elements in a plurality of interaction events to the user. In some embodiments, the number, shape, location, and/or moving speed of target elements and obstacle elements in a subsequent event may be dynamically adjusted based on scores from prior events. For example, the difficulty of an event may be increased or reduced based on user's prior scoring. In some embodiments, the number of interaction event in an interaction session and/or duration of the interaction session may correspond to the length of an audio file such as a song. In some embodiments, the system may pause the processing of the signal from the motion tracker devices and not determine user motion/posture between interaction events to reduce processing power demand.

In step 250, the system determines a session score based on multiple events scores in the interaction session. In some embodiments, the session score may be displayed to the user at the conclusion of the interaction session. In some embodiments, one or more interaction sessions of the XR content may be locked initially, and the user may be provided access to a different interaction session content (e.g., game session with a different song) in response to the session score exceeding a threshold value. In some embodiments, the user may be required to obtain a perfect score in one interaction session content before accessing the next interaction session content.

With the method shown in FIG. 3, a user can intuitively engage in physical movement in response to XR content displays. The inclusion of both avoidance and target elements increases the ways a user can be challenged, encourages the user to utilize problem solving skills along with the physical actions, and allows for multiple solutions and dynamic scoring of each interaction event.

Next referring to FIG. 3, a method 300 for generating interactive XR content is shown. In some embodiments, the method 300 is executed by a processor-based system or apparatus, such as the computer system 110. In some embodiments, the method described with reference to FIG. 3 may be provided via a video game software executing on a processor-based system communicatively coupled to a motion tracker device and a XR display device to provide an XR interactive experience to a user.

In step 310, the system provides audio content such as a song. In some embodiments, the song may be selected by the user from a library or uploaded by the user. In some embodiments, the system may process the audio content to determine the timing of beats in the audio. For example, the system may detect beats based on amplitudes of select frequencies within the audio. In some embodiments, the user may be prompted to move/dance to the audio in step 310.

In step 305, the user's motion is tracked via a motion tracker device. In some embodiments, step 305 may be the same or similar as step 205 in FIG. 2. In step 320, the user's movement during the audio playback is recorded in a memory. In some embodiments, the user's full body movement is recorded.

In step 330, the system generates obstacle elements and target elements based on the recorded user movement for a custom interaction session. In some embodiments, the system may define the timing of a plurality of interaction events based on the beats of the music. In each interactive event, obstacle elements may be placed in locations that do not overlap the user's recorded body position and/or target elements may be placed at locations of user's select body part. For example, an obstacle element may be placed to the left of the user if the user steps right during an interaction event. In another example, a target element may be placed at the location of the right hand if the user raises their right hand during the interaction event. In some embodiments, the target elements and the obstacle elements of the custom interaction session are timed based on an audio associated with the recorded user motion.

In some embodiments, in step 340, the locations, timings and/or speed of the obstacle elements and target elements generated in step 330 are stored as a customer interaction session on a memory. In some embodiments, a customer interaction session may be accessed by the user and/or shared with other users over a network. In some embodiments, the customer interaction session may be accessed to provide an interaction session according to FIG. 2.

With the method shown in FIG. 3, users can easily generate custom interaction sessions that can be shared with other users. Users can access a variety of interaction content and through gameplay, emulate the movement of other users moving or dancing to select music.

Next referring to FIG. 4, an illustration of an XR content display according to some embodiments is shown. FIG. 4 is shown from the user's perspective. The content includes a 3D space 400 in which an interaction plane 405 is defined. Generally, the interaction plane 405 is not visible to the user but is tracked by the system. From the user's perspective, obstacle elements 410 and target elements 420 move toward the interaction plane 405 and the user during the interaction session. The user can then move their bodies to contact and/or avoid the obstacle elements 410 and/or the target elements 420 as they approach the user.

In FIG. 4, two obstacle elements 410 are shown, intersecting on the lower left-hand corner. To score, the user may, for example, jump up on the right side of the 3D space to avoid contacting the obstacle elements 410. Also in FIG. 4, the target elements 420 includes a hand target and a foot target. To score, the user may position their hand and foot to contact the corresponding target elements as they jump.

Next referring to FIG. 5, another illustration of an XR content display according to some embodiments is shown. In FIG. 5, the position of the user 403 is shown for illustrative purposes, and an avatar of the user may or may not be part of the displayed XR content.

FIG. 5 similarly shows a d space 400 with an interaction plane 405 which may not be visible to the user. FIG. 5 shows an interaction event including a target element 425 and a linear obstacle element 410 that is perpendicular to the interaction plane 405 passing through the interaction plane 405. For the interaction event, the user 403 steps to the right to avoid the obstacle elements 410 while reaching to the left to touch the target element 425. In the moment illustrated in FIG. 5, the target element 425 has been successfully contacted, and has changed in appearance, in this case to "boom" to indicate success. FIG. 5 further shows additional obstacle elements 410 and target elements 420 moving from a distance towards the interaction plane 405 and the user 403.

FIG. 6, yet another illustration of an XR content display according to some embodiments is shown. In FIG. 6, the position of the user 403 is shown for illustrative purposes, and an avatar of the user may or may not be part of the displayed XR content.

In FIG. 6, an interaction event with two obstacle elements 410 forming an "x" is shown. In the moment illustrated in FIG. 6, obstacle elements 410 have arrived at the interaction plane 405 but the user 403 has not moved into a position to avoid contacting the obstacle elements 410. The user 403 will receive a low, no, or negative event score for the event shown in FIG. 6.

Figures 7A, 7B, 7C:
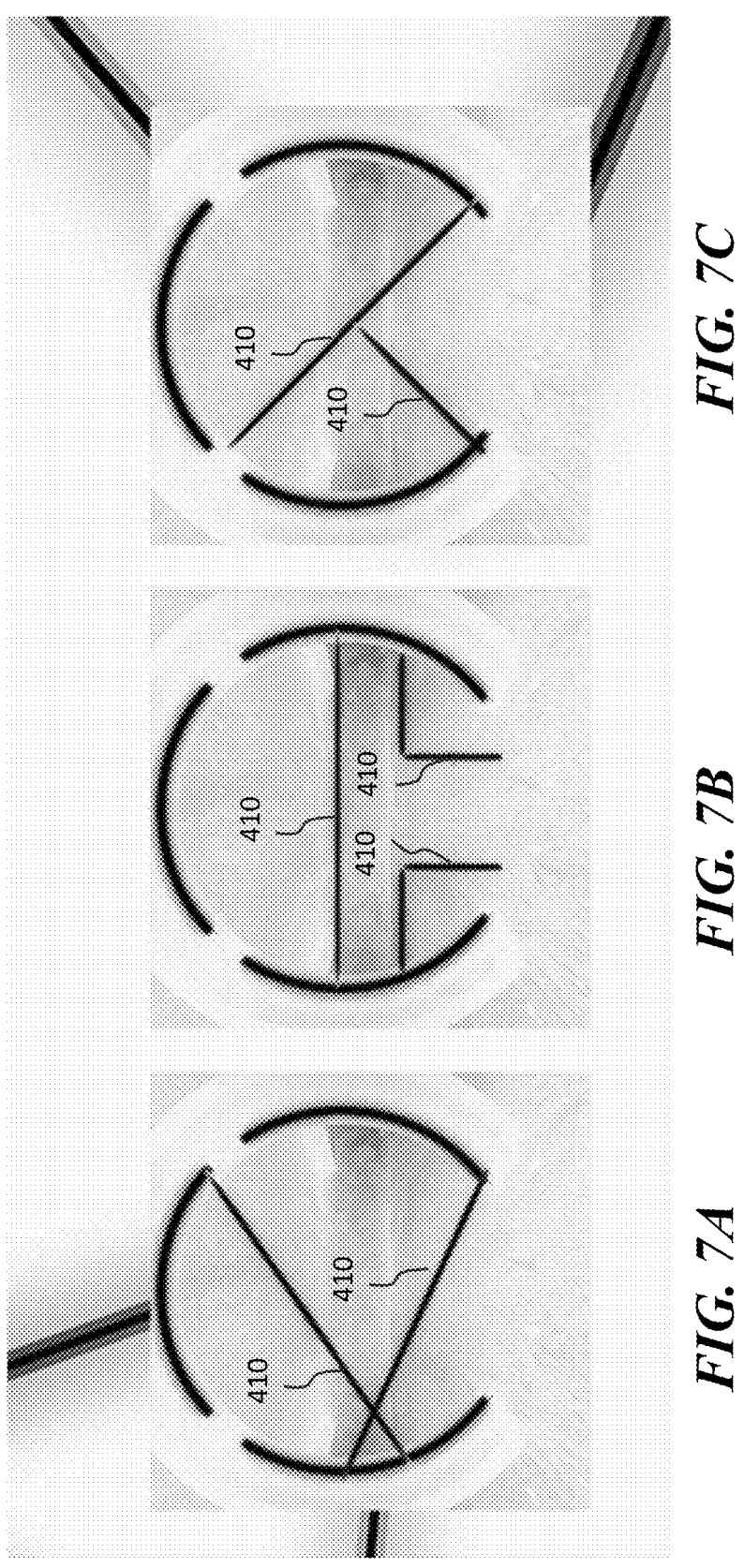
FIGS. 7A, 7B, and 7C are illustrations of obstacle elements according to some embodiments.

FIGS. 7A, 7B, and 7C illustrate embodiment of obstacle elements that may be displayed in the XR content described herein. In FIG. 7A, two diagonal linear elements extend across the 3D space and intersect on the left side of the space. In FIG. 7B, aa horizontal linear obstacle element 410 extends across the middle of the 3D space and two additional L shape elements bracket the lower left and lower right corners. In FIG. 7C, a first diagonal linear obstacle element 410 extends across the 3D space, and a second diagonal linear obstacle element extends from the first element to a lower left corner of the 3D space.

The obstacle elements in FIGS. 7A, 7B, and 7C give users a variety of challenges and posture options for clearing interaction event. These obstacle elements 410 are illustrated as examples only and obstacle elements 410 and target elements 420 may be variously shaped and positioned without departing from the spirit of the present disclosure.

In some embodiments, one or more of the embodiments, methods, approaches, schemes, and/or techniques described above may be implemented in one or more computer programs or software applications executable by a processor-based apparatus or system. By way of example, such processor-based system may comprise a smartphone, tablet computer, virtual reality (VR), augmented reality (AR), or mixed reality (MR) system, entertainment system, game console, mobile device, computer, workstation, gaming computer, desktop computer, notebook computer, server, graphics workstation, client, portable device, pad-like device, communications device or equipment, etc. Such computer program(s) or software may be used for executing various steps and/or features of the above-described methods, schemes, and/or techniques. That is, the computer program(s) or software may be adapted or configured to cause or configure a processor-based apparatus or system to execute and achieve the functions described herein. For example, such computer program(s) or software may be used for implementing any embodiment of the above-described methods, steps, techniques, schemes, or features by generating content for display as described herein. As another example, such computer program(s) or software may be used for implementing any type of tool or similar utility that uses any one or more of the above-described embodiments, methods, approaches, schemes, and/or techniques. In some embodiments, one or more such computer programs or software may comprise a VR, AR, or MR application, communications application, object positional tracking application, a tool, utility, application, computer simulation, computer game, video game, role-playing game (RPG), other computer simulation, or system software such as an operating system, BIOS, macro, or other utility. In some embodiments, program code macros, modules, loops, subroutines, calls, etc., within or without the computer program(s) may be used for executing various steps and/or features of the above-described methods, schemes and/or techniques. In some embodiments, such computer program (s) or software may be stored or embodied in a non-transitory computer readable storage or recording medium or media, such as a tangible computer readable storage or recording medium or media. In some embodiments, such computer program(s) or software may be stored or embodied in transitory computer readable storage or recording medium or media, such as in one or more transitory forms of signal transmission (for example, a propagating electrical or electromagnetic signal).

Therefore, in some embodiments the present invention provides a computer program product comprising a medium for embodying a computer program for input to a computer and a computer program embodied in the medium for causing the computer to perform or execute steps comprising any one or more of the steps involved in any one or more of the embodiments, methods, approaches, schemes, and/or techniques described herein for generating content. For example, in some embodiments the present invention provides one or more non-transitory computer readable storage mediums storing one or more computer programs adapted or configured to cause a processor-based apparatus or system to execute steps comprising any one or more of the embodiments, methods, approaches, schemes, and/or techniques described herein for generating content for a display device.

In some aspects, the techniques described herein relate to a system for providing extended reality (XR) interactions including: a motion tracker device; an XR display device; and a processor in communication with the motion tracker device and the XR display, the processor is configured to execute computer-readable instructions to: display, via the XR display device, XR content in a three-dimensional (3D) space for an interaction session; track a full-body motion of a user relative to the 3D space via the motion tracker device; define an interaction plane in the 3D space; display to the user, via the XR display device, a plurality of obstacle elements and a plurality of target elements moving toward the interaction plane in the 3D space; determines an event score for an interaction event based on: when a target element arrives at the interaction plane, whether a user body part overlaps the target element in the interaction plane; and when an obstacle element arrives at the interaction plane, whether all user body parts avoided overlapping the obstacle element in the interaction plane; and determine and display a session score based on a plurality of event scores.

In some aspects, the techniques described herein relate to a method for providing extended reality (XR) interactions including: displaying, via an XR display, XR content in a three-dimensional (3D) space for an interaction session; tracking a full-body motion of a user relative to the 3D space via a motion tracker device; defining an interaction plane in the 3D space; displaying to the user, via the XR display, a plurality of obstacle elements and a plurality of target elements moving toward the interaction plane in the 3D space; and determining, with a processor in communication with the motion tracker device and the XR display, an event score for an interaction event based on: when a target element arrives at the interaction plane, whether a user body part overlaps the target element in the interaction plane; and when an obstacle element arrives at the interaction plane, whether all user body parts avoided overlapping the obstacle element in the interaction plane.

In some aspects, the techniques described herein relate to a non-transitory computer readable storage medium storing one or more computer programs configured to cause a processor based system to execute steps including: displaying, via an extended reality (XR) display, XR content in a three-dimensional (3D) space for an interaction session; tracking a full-body motion of a user relative to the 3D space via a motion tracker device; defining an interaction plane in the 3D space; displaying to the user, via the XR display, a plurality of obstacle elements and a plurality of target elements moving toward the interaction plane in the 3D space; and determining event score for an interaction event based on: when a target element arrives at the interaction plane, whether a user body part overlaps the target element in the interaction plane; and when an obstacle element arrives at the interaction plane, whether all user body parts avoided overlapping the obstacle element in the interaction plane.

While the invention herein disclosed has been described by means of specific embodiments and applications thereof, numerous modifications and variations could be made thereto by those skilled in the art without departing from the scope of the invention set forth in the claims.

What is claimed is:

1. A method for providing extended reality (XR) interactions comprising:

providing for display via an XR display, XR content in a three-dimensional (3D) space for an interaction session;

tracking a full-body motion of a user relative to the 3D space via a motion tracker device; defining an interaction plane in the 3D space;

providing, to the user via the XR display, a plurality of obstacle elements and a plurality of target elements moving toward the interaction plane in the 3D space; and determining, with a processor in communication with the motion tracker device and the XR display, an event score for an interaction event based on a full-body position of the user for the interaction, wherein determining the event score for the interaction event comprises:

obtaining, via the motion tracker device, the full-body position of the user for the interaction event; and determining, using a plurality of full-body positions of a plurality of other users for the interaction event, the event score for the interaction event based on a discrepancy between the full-body position of the user for the interaction event and the plurality of full-body positions of the plurality of other users for the interaction event.

2. The method of claim 1, wherein determining the event score for the interaction event based on the discrepancy comprises:

determining the discrepancy between the full-body position of the user for the interaction event and the plurality of full-body positions of the plurality of other users for the interaction event; and determining the event score in accordance with the user being in a first body-position relative to the plurality of full-body positions for the interaction event based on the discrepancy.

3. The method of claim 2, wherein the discrepancy indicates the first body-position is an uncommon body-position relative to the plurality of full-body positions for the interaction event.

4. The method of claim 2, wherein the discrepancy indicates the first body-position is a stylish body-position relative to the plurality of full-body positions for the interaction event.

5. The method of claim 2, wherein the discrepancy indicates the first body-position is a closely matching body-position relative to the plurality of full-body positions for the interaction event.

6. The method of claim 2, wherein the plurality of full-body positions of the plurality of other users for the interaction event comprise a plurality of preference full-body positions for the interaction event.

7. The method of claim 1, wherein determining the event score for the interaction event further comprises:

accessing, from a database of full-body positions comprising a plurality of full-body positions of the plurality of other users for a plurality of interaction events, the plurality of full-body positions of a plurality of other users for the interaction event.

8. The method of claim 1, wherein the interaction event corresponds with a target element of the plurality of target elements crossing the interaction plane, and wherein determining the event score for the interaction event further comprises:

determining, from the full-body position of the user for the interaction event, whether any user body part overlaps the target element in the interaction plane.

9. The method of claim 8, wherein determining whether any user body part overlaps the target element in the interaction plane further comprises:

determining whether a first user body part overlaps the target element in the interaction plane.

10. The method of claim 1, wherein the interaction event corresponds with an obstacle element of the plurality of obstacle elements crossing the interaction plane, and wherein determining the event score for the interaction event further comprises:

determining, from the full-body position of the user for the interaction event, whether all user body parts avoided overlapping the obstacle element in the interaction plane.

11. The method of claim 1, further comprising:

adjusting a location of the interaction plane based on tracking the full-body motion of the user.

12. The method of claim 1, wherein the full-body position of the user comprises respective positions of a plurality of user body parts comprising one or more of arm, leg, torso, or head.

13. A system comprising one or more computers and one or more storage devices storing instructions that are operable, when executed by the one or more computers, to cause the one or more computers to perform operations comprising:

providing for display, via an XR display, XR content in a three-dimensional (3D) space for an interaction session;

tracking a full-body motion of a user relative to the 3D space via a motion tracker device;

defining an interaction plane in the 3D space;

providing, to the user via the XR display, a plurality of obstacle elements and a plurality of target elements moving toward the interaction plane in the 3D space; and determining, with a processor in communication with the motion tracker device and the XR display, an event score for an interaction event based on a full-body position of the user for the interaction, wherein determining the event score for the interaction event comprises:

obtaining, via the motion tracker device, the full-body position of the user for the interaction event; and determining, using a plurality of full-body positions of a plurality of other users for the interaction event, the event score for the interaction event based on a discrepancy between the full-body position of the user for the interaction event and the plurality of full-body positions of the plurality of other users for the interaction event.

14. The system of claim 13, wherein determining the event score for the interaction event based on the discrepancy comprises:

determining the discrepancy between the full-body position of the user for the interaction event and the plurality of full-body positions of the plurality of other users for the interaction event; and determining the event score in accordance with the user being in a first body-position relative to the plurality of full-body positions for the interaction event based on the discrepancy.

15. The system of claim 14, wherein the discrepancy indicates the first body-position is an uncommon body-position relative to the plurality of full-body positions for the interaction event.

16. The system of claim 14, wherein the discrepancy indicates the first body-position is a stylish body-position relative to the plurality of full-body positions for the interaction event.

17. The system of claim 14, wherein the discrepancy indicates the first body-position is a closely matching body-position relative to the plurality of full-body positions for the interaction event.

18. The system of claim 13, wherein the full-body position of the user comprises respective positions of a plurality of user body parts comprising one or more of arm, leg, torso, or head.

19. A computer storage medium encoded with a computer program, the program comprising instructions that are operable, when executed by data processing apparatus, to cause the data processing apparatus to perform operations comprising:

providing for display, via an XR display, XR content in a three-dimensional (3D) space for an interaction session;

tracking a full-body motion of a user relative to the 3D space via a motion tracker device;

defining an interaction plane in the 3D space;

providing, to the user via the XR display, a plurality of obstacle elements and a plurality of target elements moving toward the interaction plane in the 3D space; and determining, with a processor in communication with the motion tracker device and the XR display, an event score for an interaction event based on a full-body position of the user for the interaction, wherein determining the event score for the interaction event comprises:

obtaining, via the motion tracker device, the full-body position of the user for the interaction event; and determining, using a plurality of full-body positions of a plurality of other users for the interaction event, the event score for the interaction event based on a discrepancy between the full-body position of the user for the interaction event and the plurality of full-body positions of the plurality of other users for the interaction event.

20. The computer storage medium of claim 19, wherein the full-body position of the user comprises respective positions of a plurality of user body parts comprising one or more of arm, leg, torso, or head.

* * * * *